United States Patent [19]

Panthöfer

[11] 4,342,401
[45] Aug. 3, 1982

[54] HOUSING FOR AQUARIUM FILTERS HAVING BAYONET FASTENING MEANS

[75] Inventor: Rudolf Panthöfer, St. Augustin, Fed. Rep. of Germany

[73] Assignee: Tetra Werke Dr. rer. nat. Ulrich Baensch GmbH, Melle, Fed. Rep. of Germany

[21] Appl. No.: 252,418

[22] Filed: Apr. 9, 1981

[30] Foreign Application Priority Data

Apr. 9, 1980 [DE] Fed. Rep. of Germany ....... 3013624

[51] Int. Cl.³ ...................... B65D 41/06; B65D 41/36
[52] U.S. Cl. .................................. 220/301; 220/293; 220/295
[58] Field of Search ........................ 220/293, 295, 301

[56] References Cited

U.S. PATENT DOCUMENTS 4,032,036 6/1977 Sycle, Jr. ....................... 220/301 X
4,203,686 5/1980 Bowman ......................... 220/301 X Primary Examiner—George T. Hall
Attorney, Agent, or Firm—Becker & Becker, Inc.

[57] ABSTRACT

A housing for an aquarium filter. The housing is pressure-resistant and is provided with a removable cover. The cover, or a ring (a thrust ring) surrounding the cover, is rotatable relative to the lower part of the housing, and an axial movement is attainable by rotation by way of inclined surfaces for attaining a sealing pressure.

15 Claims, 3 Drawing Figures

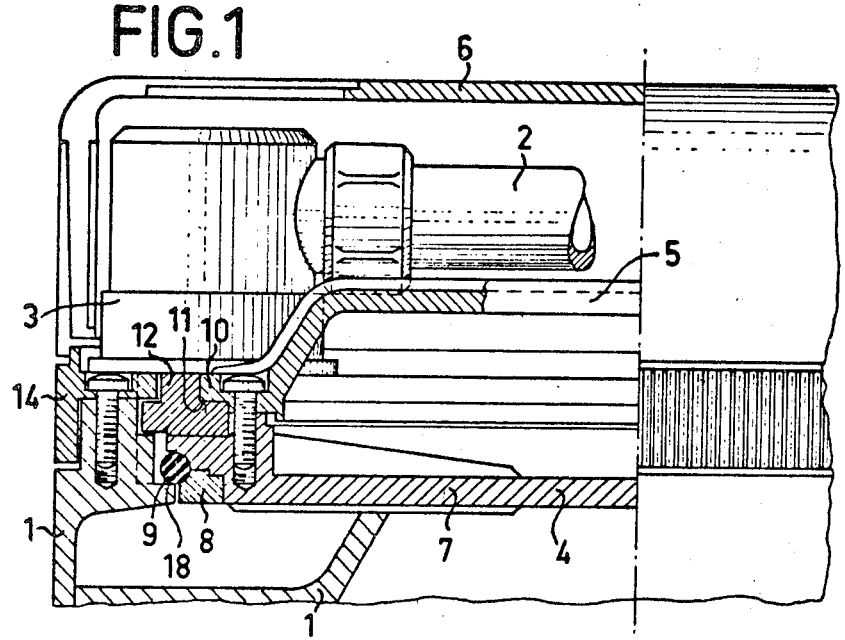
FIG.1
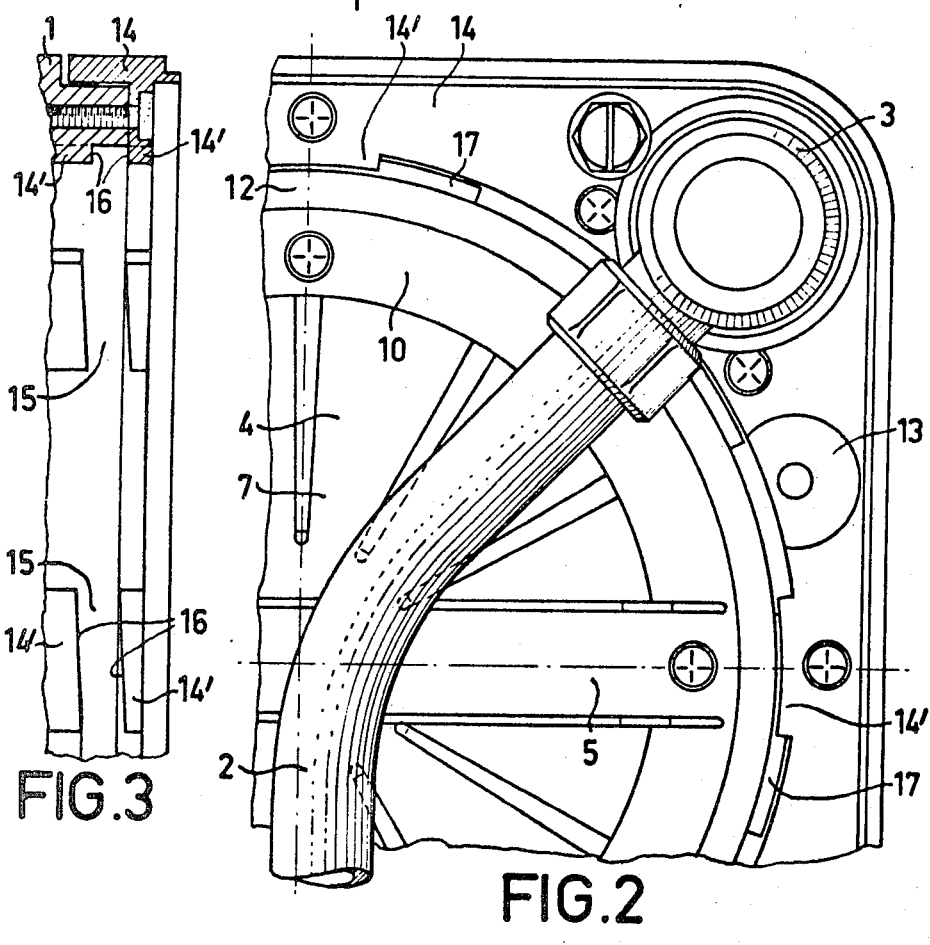
FIG.3
FIG.2

HOUSING FOR AQUARIUM FILTERS HAVING BAYONET FASTENING MEANS

The present invention relates to a housing for aquarium filters, and is made pressure-resistant and is provided with a removable cover.

Since these filters, as a rule, are used externally of the aquarium, special care must be taken with regard to their construction and handling, because, in case of damage, the contents of the aquarium may run down over the externally arranged conduits and containers.

It is therefore and object of the present invention to provide a filter housing which is securely closed, and which can be opened for the purpose of cleaning and the like and, moreover, can be opened by unskilled individuals.

This object, and other objects and advantages of the present invention, will appear more clearly from the following specification in connection with the accompanying drawing, in which:

FIG. 1 shows a vertical partial section through the upper part of a housing for an external filter for use with aquariums or ornamental ponds.

FIG. 2 is a partial plan view of the housing of FIG. 1; and

FIG. 3 is a partial section taken through the outer frame for the housing according to FIGS. 1 and 2.

The housing of the present invention is characterized primarily in that the cover, or a ring (a thrust ring) surrounding the cover is rotatable relative to the lower part of the housing, and that an axial movement is attainable by rotation by means of inclined surface for attaining a sealing pressure. Different mechanical means can be used for this purpose. Preferably, however, closures are employed which make use of a so-called quick thread or a bayonet-type closure.

Accordingly, a uniform, tight sealing pressure is attained; the sealing effect is now independent of the actuation of different machine or operating elements, including for instance several tightening screws distributed over the periphery of the housing.

It is advantageous to have the turning or rotation occur by way of a pinion or bevel gear which cooperates with a corresponding gear tooth means on the cover or the ring supported thereon. Preferably, this pinion is removably installed to preclude unauthorized handling of the cover. The pinion may also have a handle.

The pinion may be arranged in a manner to be easily releaseable.

The thrust ring may be located on the outer periphery of the cover in such a way that it is rotatable in a peripheral groove. The peripheral groove may be delimited upwardly by a detachable holding ring. The ends of a handle extending transverse to the cover may be fastened on the holding ring, whereby the handle preferably merges and is unitary with the holding ring.

A sealing ring may be provided, the lower part thereof engaging a removable holding ring.

Additionally, it is proposed to embody the mentioned inclined surfaces in such a manner that they can become effective not only during closing of the housing, but also during removal of the cover, so that a lifting off of the cover can also be attained if for some reason the cover should adhere to the housing, which for instance can happen with certain sealing rings.

In addition to the inclined surfaces which produce the sealing pressure, further inclined surfaces may be provided which serve for lifting off of the cover. Cams may be provided on the outer periphery of the cover or the thrust ring, and in the assembled condition of the cover, these cams are located in the gap between the two inclined surfaces, which essentially extend parallel to each other. The inclined surfaces may be located on the inner periphery of an outer frame forming the upper lateral edges of the lower housing part; a hood, which is supported and preferably also centered on this external frame, closes and extends over the top side of the housing.

Referring now to the drawing in detail, the housing essentially comprises a pot of cup-like lower part 1 with several inlets or outlets in the form of hoses 2 and the pertaining plug or connector fittings 3, a removable cover 4 with a transversely arranged handle 5, and a detachably mounted hood 6 projecting over the cover 4. This hood 6 is not shown in FIG. 2 to facilitate the viewing of other features of the invention.

The lower edge region of the cover plate 7 of the cover 4 has a holding ring 8 screwed thereto to form a peripheral groove for receiving a sealing ring 9 in the shape of an O-ring. A holding ring 10 is screwed from above onto the cover plate 7, and this holding ring 10 merges and in unitary with the handle 5. The holding ring 10 serves to form a peripheral groove 11 in which a rotatable thrust or pressure ring 12 is mounted. This thrust ring 12 can be rotated by a pinion or toothed gear (installed at 13) via a gear tooth system on the outer periphery of the thrust ring 12. The toothed pinion can be slipped on, and on top is provided with handle means; the pinion can be removed to prevent unauthorized rotation of the thrust ring 12.

The outer frame 14, illustrated in partial section in FIG. 3 in a ring or annular configuration, also serves for supporting and centering of the hood 6. The inner periphery of frame 14 is provided with projections 14′ which are located in pairs above each other and define a gap 15 therebetween which is delimited upwardly and downwardly by inclined surfaces 16 rising in the same direction.

The thrust ring 12 is provided with correspondingly inclined projecting cams 17 in such a way that the cams 17 can be drawn into the gap 15 when the thrust ring 12 is rotated.

For placing the cover 4 onto the filter housing and closing it, the cover 4 is turned in such a way that cams 17 are grasped by the upper inclined surfaces 16 and are pressed downwardly, whereby the sealing ring 9 is pressed into engagement. For loosening and removing the cover 4, it is rotated in the opposite direction, whereby the cams 17 slide upon the lower inclined surfaces 16 in such a manner that an axial lifting off movement of the cover 4 occurs.

In order to attain a good sealing effect, the sealing ring 9 rests on a step 18 on the lower housing part 1.

A combining of the handle 5 with the holding ring 10 is also advantageous. In this case, it is only necessary to fasten the holding ring 10 by screws or the like. Accordingly, special fastening means for the handle 5 are made superfluous.

The present invention is, of course, in no way restricted to the specific disclosure of the specification and drawing, but also encompasses any modifications within the scope of the appended claims.

What I claim is:

1. A pressure-resistant housing for aquarium filters, comprising:
   a housing frame having at least one inlet and at least one outlet, said housing frame including inner inclined surfaces; and
   a cover detachably connected to said housing frame and being rotatable relative thereto, closure of said cover, accompanied by rotation thereof, being effected by an axial movement thereof effected by means of said inclined surfaces of said housing frame, said axial movement providing a sealing pressure between said cover and said housing frame.

2. A housing according to claim 1, which includes a thrust ring mounted in and surrounding said cover, said thrust ring interposed between said cover and said housing frame, and rotatable relative to said housing frame.

3. A housing according to claim 1, in which closure of said cover is a quick thread closure.

4. A housing according to claim 1, in which closure of said cover is a bayonet-type closure.

5. A housing according to claim 2, in which said thrust ring is provided with a gearing, and which includes a pinion mounted on said housing frame and adapted to cooperate with said gearing for effecting rotation of said thrust ring.

6. A housing according to claim 5, in which said pinion is provided with a handle, and is detachably mounted on said housing frame.

7. A housing according to claim 6, in which said pinion is easily releasable.

8. A housing according to claim 2, in which said cover includes an outer peripheral groove, said thrust ring being rotatably mounted in said groove.

9. A housing according to claim 8, in which said cover includes a detachable holding ring which partially delimits said peripheral groove.

10. A housing according to claim 9, in which said cover includes a handle having ends which extend transverse to said cover and are fastened to said holding ring.

11. A housing according to claim 10, in which said handle of said cover merges and is unitary with said holding ring.

12. A housing according to claim 1, which includes a sealing ring interposed between said cover and said housing frame, and in which said cover includes a detachable holding ring for forming with said cover a peripheral groove for receiving a portion of said sealing ring.

13. A housing according to claim 2, which, in addition to said inclined surfaces which effect said sealing pressure, includes further inclined surfaces which serve for lifting said cover off said housing frame.

14. A housing according to claim 13, which includes at least one pair of essentially parallel inclined surfaces separated by a gap, and in which the outer peripheral surface of said thrust ring includes, as said further inclined surfaces, cams which, when said cover is closed, are located in respective gaps.

15. A housing according to claim 14, in which said housing frame includes a lower housing part, and an outer frame adjacent thereto, said inclined surfaces being located on the inner periphery of said outer frame; and which includes a hood which is supported on said outer frame and closes that side of said housing remote from said lower housing part.

* * * * *